(12) United States Patent
Bergström et al.

(10) Patent No.: US 10,149,430 B2
(45) Date of Patent: Dec. 11, 2018

(54) ROBOTIC WORK TOOL CONFIGURED FOR IMPROVED TURNING IN A SLOPE, A ROBOTIC WORK TOOL SYSTEM, AND A METHOD FOR USE IN THE ROBOT WORK TOOL

(71) Applicant: HUSQVARNA AB, Huskvarna (SE)

(72) Inventors: Jonas Bergström, Malmbäck (SE); Fredrik Klackensjö, Forserum (SE); Olle Markusson, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 9 days.

(21) Appl. No.: 14/767,122

(22) PCT Filed: Feb. 20, 2013

(86) PCT No.: PCT/SE2013/050141
§ 371 (c)(1),
(2) Date: Aug. 11, 2015

(87) PCT Pub. No.: WO2014/129941
PCT Pub. Date: Aug. 28, 2014

(65) Prior Publication Data
US 2015/0366130 A1    Dec. 24, 2015

(51) Int. Cl.
*A01D 34/00* (2006.01)
*B62D 11/00* (2006.01)
(Continued)

(52) U.S. Cl.
CPC .......... *A01D 34/008* (2013.01); *A01D 75/28* (2013.01); *B60L 1/003* (2013.01); *B60L 3/0061* (2013.01);
(Continued)

(58) Field of Classification Search
CPC .. A01D 41/145; A01D 34/736; A01D 34/661; A01D 34/733; A01D 34/006;
(Continued)

(56) References Cited

U.S. PATENT DOCUMENTS 5,204,814 A * 4/1993 Noonan ............... A01D 34/008
                                                           180/168
5,444,965 A * 8/1995 Colens ................. A01D 34/008
                                                           56/10.2 A (Continued)

FOREIGN PATENT DOCUMENTS

EP    1745686 A1    1/2007
EP    2412221 A2    2/2012
(Continued)

OTHER PUBLICATIONS

International Search Report and Written Opinion in application No. PCT/SE2013/050141 dated Jan. 7, 2014.
(Continued)

*Primary Examiner* — Courtney D Heinle
*Assistant Examiner* — Luis A Martinez Borrero
(74) *Attorney, Agent, or Firm* — McNair Law Firm, P.A.

(57) ABSTRACT

Robotic work tool (100) configured for improved turning in a slope (S), said robotic work tool comprising a slope detector (190), at least one magnetic field sensor (170), a controller (110), and at least two driving wheels (130"), the robotic work tool (100) being configured to detect a boundary wire (250) and in response thereto determine if the robotic work tool (100) is in a slope (S), and if so, perform a turn by rotating each wheel (130") at a different speed thereby reducing a risk of the robotic work tool (100) getting stuck.

20 Claims, 3 Drawing Sheets

(51) Int. Cl.
    *B60L 1/00*          (2006.01)
    *B60L 3/00*          (2006.01)
    *B60L 8/00*          (2006.01)
    *B60L 11/18*        (2006.01)
    *B60L 15/20*        (2006.01)
    *G05D 1/02*         (2006.01)
    *A01D 75/28*       (2006.01)

(52) U.S. Cl.
    CPC ........... *B60L 8/003* (2013.01); *B60L 11/1805* (2013.01); *B60L 11/1818* (2013.01); *B60L 11/1877* (2013.01); *B60L 15/20* (2013.01); *B62D 11/001* (2013.01); *G05D 1/027* (2013.01); *G05D 1/0212* (2013.01); *G05D 1/0259* (2013.01); *G05D 1/0265* (2013.01); *B60L 2200/40* (2013.01); *B60L 2240/36* (2013.01); *B60L 2240/421* (2013.01); *B60L 2260/32* (2013.01); *G05D 2201/0208* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/72* (2013.01); *Y02T 10/7275* (2013.01); *Y02T 90/14* (2013.01); *Y10S 901/01* (2013.01)

(58) Field of Classification Search
    CPC .............. A01D 34/6818; A01D 34/826; A01D 43/063; A01D 34/008; A01D 34/4166; A01D 34/664; A01D 43/006; A01D 61/008; A01D 34/00; A01D 43/073; A01D 75/00; A01D 34/44; A01D 34/52; A01D 34/71; A01D 41/14; A01D 41/142; G05D 2201/0208; G05D 1/0265; G05D 1/0088; G05D 1/0219; G05D 1/0221; G05D 1/0044; G05D 1/0274; G05D 1/0225; G05D 1/0242; G05D 2201/0201; G05D 1/028; G05D 1/0272; Y02T 10/7072; Y02T 10/7275; Y02T 10/645; Y02T 10/7005; Y02T 10/7044; Y02T 10/6217; Y02T 10/7066; Y02T 90/14; Y02T 10/7291; Y02T 90/122; Y10S 903/905; Y10S 901/41; Y10S 901/28; Y10S 1/05; Y10S 901/06; G05B 2219/32217; G05B 15/02; G05B 19/0426; G05B 19/042; G01R 33/385; G01R 33/288; G01R 33/3815; G01R 33/3854
    USPC ..... 701/23, 50, 25, 36, 2, 22; 901/1, 28, 41, 901/46, 5, 6, 9
    See application file for complete search history.

(56) References Cited

U.S. PATENT DOCUMENTS

| | | | | |
|---|---|---|---|---|
| 5,928,309 A * | 7/1999 | Korver | | G01C 21/165 342/359 |
| 5,974,347 A * | 10/1999 | Nelson | | A01D 34/008 180/168 |
| 6,009,358 A * | 12/1999 | Angott | | A01D 34/008 180/168 |
| 6,255,793 B1 * | 7/2001 | Peless | | A01D 34/008 180/168 |
| 6,332,103 B1 * | 12/2001 | Steenson, Jr. | | A61G 5/04 172/9 |
| 6,615,108 B1 * | 9/2003 | Peless | | G05D 1/0219 180/167 |
| 6,809,490 B2 * | 10/2004 | Jones | | G05D 1/0219 318/568.12 |
| 7,024,842 B2 * | 4/2006 | Hunt | | A01D 34/008 56/6 |
| 7,224,088 B2 * | 5/2007 | Shoemaker | | A01D 34/828 307/328 |
| 7,239,944 B2 * | 7/2007 | Dean | | A01D 34/008 701/23 |
| 7,332,890 B2 * | 2/2008 | Cohen | | A47L 9/2857 320/109 |
| 7,343,230 B2 * | 3/2008 | McMurtry | | A01B 79/005 172/2 |
| 7,388,343 B2 * | 6/2008 | Jones | | G05D 1/0219 318/568.12 |
| 7,448,113 B2 * | 11/2008 | Jones | | A47L 5/30 15/319 |
| 7,567,052 B2 * | 7/2009 | Jones | | A47L 9/009 318/587 |
| 7,613,543 B2 * | 11/2009 | Petersson | | A01D 34/008 180/167 |
| 7,613,552 B2 * | 11/2009 | Bernini | | A01D 34/008 180/168 |
| 7,668,631 B2 * | 2/2010 | Bernini | | A01B 69/008 180/168 |
| 7,761,954 B2 * | 7/2010 | Ziegler | | A47L 5/14 15/320 |
| 8,046,951 B2 * | 11/2011 | Peters | | F41G 1/473 356/11 |
| 8,290,623 B2 * | 10/2012 | Yan | | A47L 11/4061 700/258 |
| 8,336,282 B2 * | 12/2012 | Messina | | A01D 34/008 56/320.1 |
| 8,374,721 B2 * | 2/2013 | Halloran | | A47L 5/30 700/245 |
| 8,380,350 B2 * | 2/2013 | Ozick | | A47L 5/30 700/253 |
| 8,392,044 B2 * | 3/2013 | Thompson | | A01D 34/008 180/168 |
| 8,396,592 B2 * | 3/2013 | Jones | | A47L 11/00 318/568.12 |
| 8,406,949 B2 * | 3/2013 | Kondo | | G05D 1/0261 701/23 |
| 8,428,776 B2 * | 4/2013 | Letsky | | A01D 34/008 700/245 |
| 8,521,384 B2 * | 8/2013 | O'Connor | | A01G 20/30 701/69 |
| 8,543,295 B2 * | 9/2013 | Bryant | | B60K 28/16 701/42 |
| 8,544,570 B2 * | 10/2013 | Ishii | | A01D 34/64 180/197 |
| 8,600,582 B2 * | 12/2013 | Bernini | | A01D 34/008 700/258 |
| 8,634,960 B2 * | 1/2014 | Sandin | | G05D 1/028 56/10.2 E |
| 8,666,550 B2 * | 3/2014 | Anderson | | A01D 34/008 700/253 |
| 8,668,033 B2 * | 3/2014 | Koike | | B62D 11/003 180/6.48 |
| 8,706,339 B2 * | 4/2014 | Thompson | | A01D 34/008 180/168 |
| 8,740,229 B2 * | 6/2014 | Ellsworth | | B62D 6/04 180/282 |
| 8,881,339 B2 * | 11/2014 | Gilbert, Jr. | | A47L 9/0477 15/319 |
| 8,918,241 B2 * | 12/2014 | Chen | | G05D 1/0219 318/568.12 |
| 8,938,318 B2 * | 1/2015 | Bergstrom | | A01D 34/008 356/614 |
| 9,072,218 B2 * | 7/2015 | Johnson | | A01D 34/008 |
| 9,173,343 B2 * | 11/2015 | Bernini | | A01D 34/008 |
| 9,204,594 B2 * | 12/2015 | Hwang | | A01D 34/008 |
| 9,229,454 B1 * | 1/2016 | Chiappetta | | G05D 1/0225 |
| 9,237,689 B2 * | 1/2016 | Choi | | A01D 34/008 |
| 9,258,942 B2 * | 2/2016 | Biber | | G05D 1/0219 |
| 9,317,038 B2 * | 4/2016 | Ozick | | A47L 9/009 |
| 9,320,398 B2 * | 4/2016 | Hussey | | A47L 5/30 |
| D760,806 S * | 7/2016 | Cmich | | D15/14 |
| 9,380,742 B2 | 7/2016 | Biber et al. | | |

(56) References Cited

U.S. PATENT DOCUMENTS

| | | | |
|---|---|---|---|
| 9,420,741 B2* | 8/2016 | Balutis | G05D 1/0265 |
| 9,436,185 B2* | 9/2016 | Schnittman | G05D 1/0227 |
| 9,554,508 B2* | 1/2017 | Balutis | A01D 34/008 |
| 9,725,012 B2* | 8/2017 | Romanov | A47L 11/4036 |
| 2002/0156556 A1* | 10/2002 | Ruffner | A01B 69/008 |
| | | | 701/23 |
| 2003/0023356 A1* | 1/2003 | Keable | G05D 1/0219 |
| | | | 701/23 |
| 2005/0034437 A1* | 2/2005 | McMurtry | A01D 34/008 |
| | | | 56/1 |
| 2005/0060975 A1* | 3/2005 | McClymonds | A01D 34/008 |
| | | | 56/10.2 A |
| 2005/0230166 A1* | 10/2005 | Petersson | A01D 34/008 |
| | | | 180/170 |
| 2006/0191250 A1* | 8/2006 | Neuerburg | A01B 69/004 |
| | | | 56/6 |
| 2009/0000839 A1* | 1/2009 | Ishii | A01D 34/64 |
| | | | 180/65.51 |
| 2010/0114435 A1* | 5/2010 | Boylston | A01D 75/28 |
| | | | 701/45 |
| 2010/0191408 A1* | 7/2010 | Boylston | A01D 75/28 |
| | | | 701/31.4 |
| 2011/0295457 A1* | 12/2011 | Linda | B60T 8/172 |
| | | | 701/498 |
| 2012/0047862 A1 | 3/2012 | Baird | |
| 2012/0095636 A1* | 4/2012 | Ishii | A01D 34/64 |
| | | | 701/22 |
| 2012/0136539 A1* | 5/2012 | Bryant | B60T 8/175 |
| | | | 701/42 |
| 2012/0265391 A1* | 10/2012 | Letsky | A01D 34/008 |
| | | | 701/25 |
| 2012/0298429 A1 | 11/2012 | Greenwood et al. | |
| 2013/0025957 A1* | 1/2013 | Ellsworth | A01D 34/64 |
| | | | 180/210 |
| 2014/0012418 A1* | 1/2014 | Johnson | A01D 34/008 |
| | | | 700/258 |
| 2014/0012453 A1* | 1/2014 | Johnson | G05D 1/0219 |
| | | | 701/23 |
| 2014/0025274 A1* | 1/2014 | Bryant | B60T 8/175 |
| | | | 701/83 |
| 2014/0102062 A1* | 4/2014 | Sandin | G05D 1/0255 |
| | | | 56/10.2 A |
| 2017/0094897 A1* | 4/2017 | Balutis | A01D 34/008 |
| 2017/0351260 A1* | 12/2017 | Willgert | G05D 1/027 |

FOREIGN PATENT DOCUMENTS

| | | |
|---|---|---|
| WO | 2006087542 A1 | 8/2006 |
| WO | 2013104455 A1 | 7/2013 |

OTHER PUBLICATIONS

International Preliminary Report on Patentability in application No. PCT/SE2013/050141 dated Aug. 25, 2015.

* cited by examiner

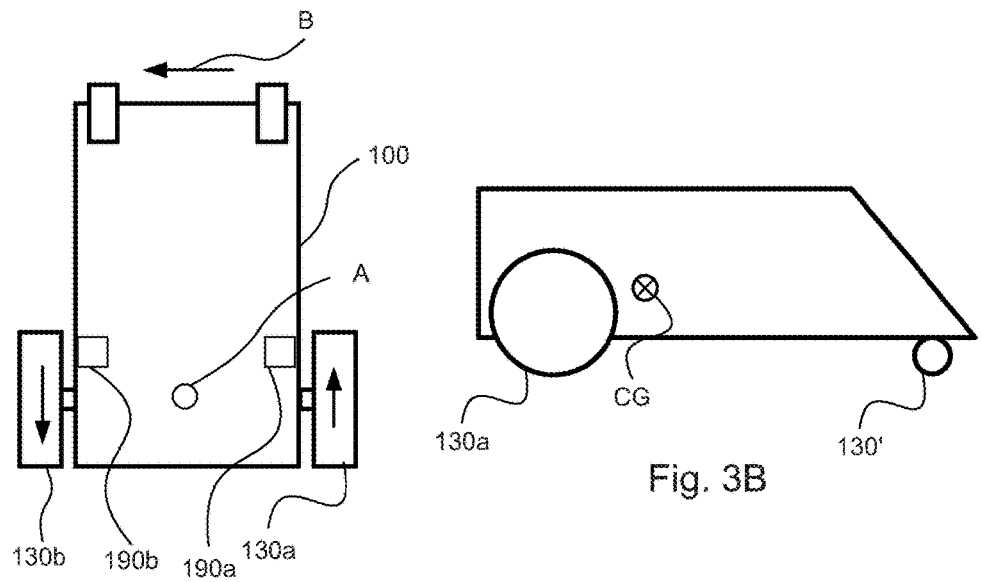
Fig. 3A
Fig. 3B
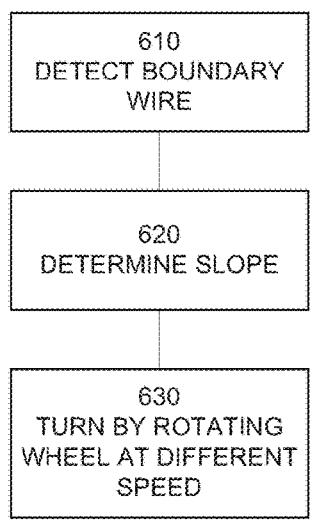
Fig. 6

ROBOTIC WORK TOOL CONFIGURED FOR IMPROVED TURNING IN A SLOPE, A ROBOTIC WORK TOOL SYSTEM, AND A METHOD FOR USE IN THE ROBOT WORK TOOL

TECHNICAL FIELD

The present invention relates to a method for avoiding wheel slip of a robotic lawn mower during turn effected by rotating driving wheels of the mower with different speed and direction.

The invention also relates to a lawn mower system comprising a self propelling robotic lawn mower and a boundary wire limiting an area to be mowed, the self propelling robotic lawn mower turning away from the boundary wire by shifting rotational speed and direction of at least one driving wheel.

Finally, the invention relates to a lawn mower comprised in the system.

BACKGROUND

Robotic lawn mowers are gaining popularity—more and more people are discovering the charm of not having to move their lawn manually or with a powered lawn mower. Moreover, the robotic lawn mowers are usually powered by electricity from the electric grid, meaning that pollutants from engine powered lawn mowers are avoided.

Usually, robotic lawn mower are chargeable electric devices comprising two individually powered drive wheels, a mowing means, sensors to detect a work space boundary and means for allowing the robotic lawn mower to find its way to the charger.

When in operation, a robotic lawn mower will run back and forth over the working area, which is delimited by a boundary wire buried shallowly near the working area, through which wire an electric current having a specific signature is fed. The electric current fed through the wire will create a magnetic field. The sensors of the robotic lawn mower will notify a controller of the robotic law mower when the robotic lawn mower approaches a boundary wire, and at a predetermined position of the robotic mower vis-à-vis the boundary wire, the robotic mower will back away slightly perform a predetermined turn and continue in the forward direction away from the boundary wire.

In most robotic mowers, the turn is effected by rotating the drive wheels of the robotic mower in opposite directions such that the robotic mower turns around a vertical axis extending through the robotic mower between the drive wheels. The other wheel pair is usually hinged in order to allow for it to move in any direction.

This way of turning the robotic mower away from the boundary wire is flawless if the boundary wire is placed on even ground, but it has turned out that there will be problems with the turn if the boundary wire is provided in a slope, since the wheel having the worst grip often slips, causing wear of the lawn and possible stuck of the robotic mower, such that it cannot continue cutting without being helped manually to another position.

It is the object of the present invention to solve, or at least mitigate, the problem of wheel slip during turn of the robotic mower.

SUMMARY

The above and other problems are solved or at least mitigated by a robotic work tool configured for improved turning in a slope, said robotic work tool comprising a slope detector, at least one magnetic field sensor, a controller, and at least two driving wheels, the robotic work tool being configured to detect a boundary wire, determine if the robotic work tool is in a slope, and if so, perform a turn by rotating each wheel at a different speed thereby reducing a risk of the robotic work tool getting stuck.

In one embodiment the robotic work tool is further configured for determining that the robotic work tool is in a slope by using data from said slope detector, being at least one inclinometer, indicating that the robotic work tool is in a slope by indicating an inclination exceeding a certain threshold value.

In one embodiment the robotic work tool is further configured for avoiding wheel slip during a turn in a slope by: determining a wheel slip or risk of wheel slip by using data from said slope detector, being at least one accelerometer, comparing measured acceleration data with data expected for a certain shift of rotational speed of one of the driving wheels; and reducing the rotational speed of the driving wheel indicating a wheel slip or risk of wheel slip which is indicated by a mismatch between the measured acceleration data and the expected acceleration data.

In one embodiment the robotic work tool is further configured to reverse the rotational direction of one driving wheel and reduce the rotational speed of the driving wheel having the least expected grip.

In one embodiment the robotic work tool is further configured to detect that the robotic work tool is approaching the boundary wire substantially head on, and in response thereto, reduce the rotational speed of either of the driving wheels such that the robotic work tool performs a U-turn.

In one embodiment the robotic work tool is configured to detect that the robotic work tool is approaching the boundary wire substantially head on by comparing sensor signals from the at least one magnetic field sensor, whereof at least one of the at least one magnetic field sensors is a front magnetic field sensor and if the sensor signals are substantially equal for the at least one front magnetic field sensor determine that the robotic work tool is approaching the boundary wire substantially head on.

In one embodiment the robotic work tool is further configured to detect that the robotic work tool is approaching the boundary wire at an angle, and in response thereto, reduce the rotational speed of either of the driving wheels such that the robotic work tool performs an L-turn.

In one embodiment the robotic work tool is configured to detect that the robotic work tool is approaching the boundary wire at an angle by comparing sensor signals from the at least one magnetic field sensor, whereof at least one of the at least one magnetic field sensors is a front magnetic field sensor and if the sensor signals for the at least one front magnetic field sensor differs by more than a threshold value, determine that the robotic work tool is approaching the boundary wire at an angle.

In one embodiment the at least one accelerometer is two accelerometers, situated such that each of the accelerometers can measure the acceleration imparted by a change of rotational speed or direction of a corresponding wheel.

In one embodiment the at least one inclinometer measures at least the sideways inclination of the robotic work tool.

In one embodiment the sideways inclination of the robotic work tool is used to determine which driving wheel has the least load and consequently least grip.

In one embodiment the reduction of rotational speed of the wheel having the least load is proportional to a measured inclination.

In one embodiment the rotational speed of the wheel having the least load is zero when the sideways inclination has reached a predetermined threshold value.

In one embodiment the predetermined threshold value is determined by the maximum slope of the ground to be serviced.

In one embodiment the threshold value is 35 degrees.

In one embodiment the robotic work tool is a robotic lawnmower.

The above and other problems may also be solved or at least mitigated by a robotic work tool system comprising a robotic work tool according to above and a boundary wire demarcating a work area.

The above and other problems may also be solved or at least mitigated by a method for use in a robotic work tool for improved turning in a slope, said robotic work tool comprising a slope detector, at least one magnetic field sensor, a controller, and at least two driving wheels, the method comprising detecting a boundary wire, determining if the robotic work tool is in a slope, and if so, performing a turn by rotating each wheel at a different speed thereby reducing a risk of the robotic work tool getting stuck.

The above and other problems may also be solved or at least mitigated by a robotic work tool comprising a slope detector, a controller, and at least two driving wheels, the robotic work tool being configured to configured for avoiding wheel slip during a turn by determining a wheel slip or risk of wheel slip by using data from said slope detector, being at least one accelerometer, comparing measured acceleration data with data expected for a certain shift of rotational speed of one of the driving wheels, and reducing the rotational speed of the driving wheel indicating a wheel slip or risk of wheel slip which is indicated by a mismatch between the measured acceleration data and the expected acceleration data.

The above and other problems may also be solved or at least mitigated by a method for avoiding wheel slip during a turn for use in a robotic work tool comprising a slope detector, a controller, and at least two driving wheels, the method comprising determining a wheel slip or risk of wheel slip by using data from said slope detector, being at least one accelerometer, comparing measured acceleration data with data expected for a certain shift of rotational speed of one of the driving wheels, and reducing the rotational speed of the driving wheel indicating a wheel slip or risk of wheel slip which is indicated by a mismatch between the measured acceleration data and the expected acceleration data.

The above and other problems may also be solved or at least mitigated by a method comprising the steps of:

a. determining a wheel slip or risk of wheel slip by:

aa. using data from at least one accelerometer or at least one inclinometer;

aaa. if data from at least one accelerometer is used, comparing measured acceleration data with data expected for a certain shift of rotational speed or direction and;

aab. reducing the rotational speed of the driving wheel should the measured acceleration data and the expected acceleration data mismatch;

aba: if data from at least one inclinometer be used, reducing a rotational speed of a driving wheel having the least load, such that a rotational point RP of the mower is moved towards the wheel having the least load.

In order to determine which wheel is slipping, the at least one accelerometer may two accelerometers, situated such that each of the accelerometers can measure the acceleration imparted by a change of rotational speed or direction of a corresponding wheel.

The at least one inclinometer may measure at least the sideways inclination of the mower.

The sideways inclination of the mower may be used to determine which driving wheel has the least load and consequently least grip.

In order not to alter the turn of the mower more than necessary, the reduction of rotational speed of the wheel having the least load may be proportional to a measured inclination.

The rotational speed of the wheel having the least load may be zero when the sideways inclination has reached a predetermined threshold value.

The predetermined threshold value may be determined by the maximum slope of the lawn to be mowed. The threshold value may also be set to 35 degrees, which is the maximum slope of a lawn where the robotic mower should be used.

The above problems are also solved or mitigated by a lawn mower system comprising a self propelling robotic lawn mower and a boundary wire limiting an area to be mowed, the self propelling robotic lawn mower turning away from the boundary wire by shifting rotational speed and direction of at least one driving wheel, wherein wheel slip during turn is avoided by implementing the method of any of the preceding method steps.

The lawn mower system may comprise a charging station where the robotic lawn mower can charge its batteries.

In order to increase the working time between charges, the robotic lawn mower may comprise solar cells charging the batteries.

Finally, the above problems are solved by a lawn mower comprised in the system disclosed above.

BRIEF DESCRIPTION OF THE DRAWINGS

In the following, the invention will be described with reference to the appended drawings, wherein:

FIG. 3A is a schematic plan view showing the robotic lawn mower of FIG. 1 during a turn;

FIG. 3B is a schematic side view of the robotic lawn mower of FIGS. 1 and 3a;

FIG. 6 is a flowchart of a general method according tot the teachings herein.

DETAILED DESCRIPTION

The disclosed embodiments will now be described more fully hereinafter with reference to the accompanying drawings, in which certain embodiments are shown. This invention may, however, be embodied in many different forms and should not be construed as limited to the embodiments set forth herein; rather, these embodiments are provided by way of example so that this disclosure will be thorough and complete, and will fully convey the scope to those skilled in the art. Like numbers refer to like elements throughout, unless stated otherwise.

Figure 1:
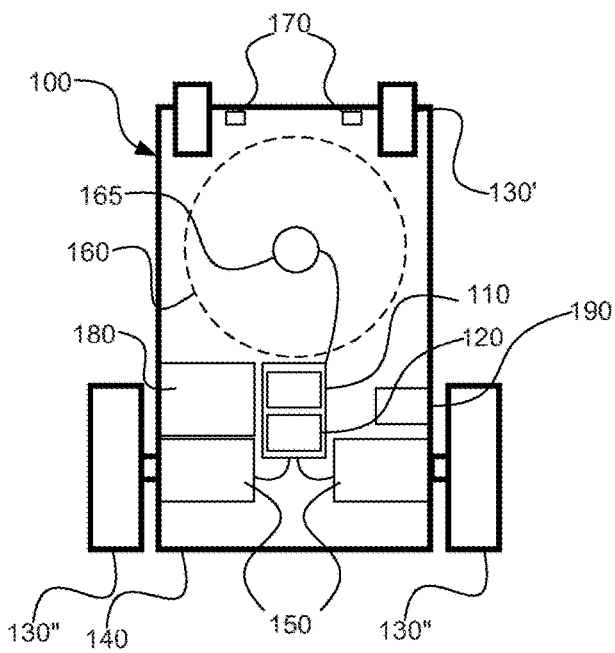
FIG. 1 is a schematic plan view of a robotic lawn mower in which the method according to the present invention may be implemented.

FIG. 1 shows a schematic overview of a robotic work tool 100 having a body 140 and a plurality of wheels 130. In the exemplary embodiment of FIG. 1 the robotic work tool 100 has four wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are each connected to a corresponding electric motor 150. This allows for driving the rear wheels 130" independently of one another which, for example, enables steep turning by running the engines in opposite directions.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, CMOS, FLASH, DDR, SDRAM or some other memory technology.

The robotic work tool 100 further has at least one sensor 170, in the example of FIG. 1 there are two sensors 170, arranged to detect a magnetic field (not shown; disclosed below with reference to FIG. 2). It should be noted that the robotic work tool 100 may be arranged with more than two front sensors, such as three sensors and/or one or more rear sensors (not shown). The sensors 170 are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

The controller 110 is connected to the motors 150 for controlling the propulsion of the robotic work tool 100 which enables the robotic work tool 100 to service an enclosed area without leaving the area.

The robotic work tool 100 further comprises a slope detector for example in the form of an inclinometer and/or an accelerometer 190.

The robotic work tool 100 also comprises a work tool 160, which may be a grass cutting device, such as a rotating blade 160 driven by a cutter motor 165. The cutter motor 165 is connected to the controller 110, which enables the controller 110 to control the operation of the cutter motor 165. The controller is also configured to determine the load exerted on the rotating blade, for example by measuring the power delivered to the cutter motor 165 or by measuring the shaft torque exerted by the rotating blade. If the motor is a DC motor, the torque may be measured e.g. by measuring the electromotive force of the motor. The robotic work tool 100 is, in one embodiment, a robotic lawnmower.

The robotic work tool 100 also has (at least) one battery 180 for providing power to the motors 150 and the cutter motor 165.

Figure 2:
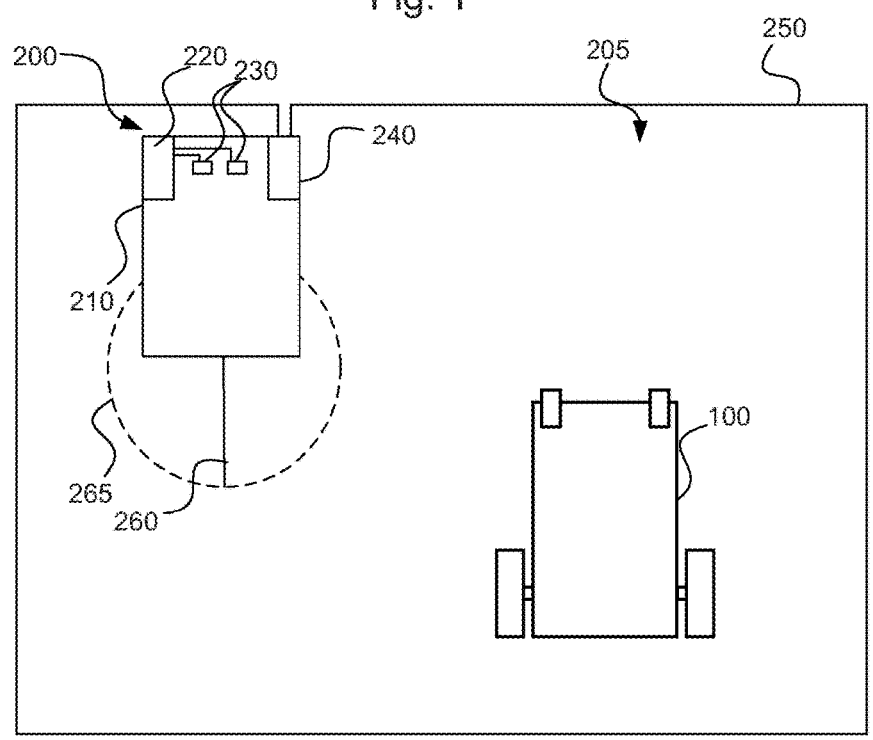
FIG. 2 is a schematic plan view of a system in which the lawn mower of FIG. 1 is comprised.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to make service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250.

In one embodiment the guide wire 260 is used to generate a magnetic field 265 for enabling the robotic work tool 100 to find the charging station without following a guide cable 260. The magnetic field is sometimes referred to as an F-range indicating the range within which the field can be sensed. The F-range 265 may be generated by the guide cable 260 or other cable, possibly being arranged in a loop, or other means for generating a magnetic field.

The robotic work tool 100 may then find the charging station 210 by following the F-range 265 towards increasing field strength.

By sending different current pulses through the guide cable 260 and the boundary wire 250, and possibly by generating the magnetic field in the F-range using a different current profile, the robotic work tool 100 will be able to determine which magnetic field results from which cable/field. The different control signals may for example comprise coded signals that differentiate the cables 250, 260.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

When the robotic work tool 100 performs its task of mowing lawns, it will criss-cross over the lawn. When it reaches the boundary wire 250, it will turn by reversing the driving direction of one of the driving wheels 130", such that the robotic work tool will rotate in the plane of the lawn around an axis extending perpendicular to the lawn, centrally between the driving wheels 130". If the robotic work tool would perform a one hundred and eighty degree turn, it would consequently go back in the track it followed before the turn. As mentioned in the preamble, it may be a problem if the turn is to be executed in a slope: the driving wheel being at the highest position of the slope tends to slip on the grass, effectively stopping the robotic work tool 100 from turning.

In FIG. 3A, a standard procedure for turning the robotic work tool 100 is shown: One of the driving wheels 130*b* (which is identical to one of the driving wheels 130" of FIG. 1) changes its driving direction, and the robotic work tool 100 will turn around a virtual axis A, located centrally between the driving wheels 130*a*, 130*b*. During the turn, the front wheels 130' will slip over the grass or accommodate to the rotating direction by being hingedly connected to the robotic work tool 100. An arrow B indicates the movement of a front portion of the robotic work tool 100 during a turn.

FIG. 3B shows the mower 100 from the side. Please note that a centre of gravity CG is located in front of the driving wheels 130*a* and 130*b*.

Figure 4:
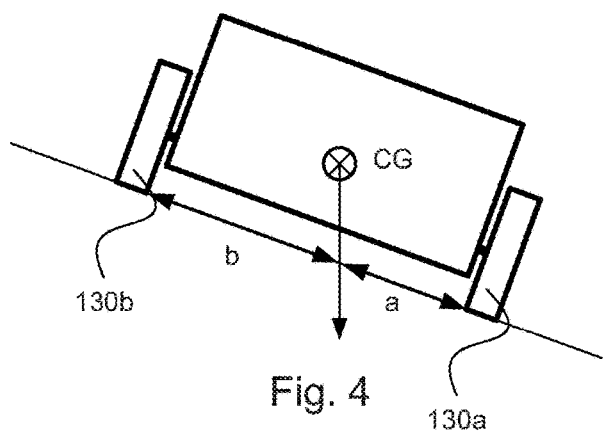
FIG. 4 is a schematic end view of a robotic lawn mower running in a slope.

FIG. 4 shows the weight distribution of the robotic work tool 100 while in a slope; as can be seen from this figure, a distance a between an intersection of the ground in a slope and a vertical axis intersecting the centre of gravity of the robotic work tool 100 and a lower wheel 130*a* will be considerably smaller than a distance b between the between a intersection of the ground in a slope and a vertical axis intersecting the centre of gravity of the robotic work tool 100 and a higher wheel 130*b*. By "upper" and "lower" is in this context meant the position of the wheels in the slope. Consequently, the lower wheel will support a larger portion of the robotic work tool 100 weight than the upper wheel.

Figure 5:
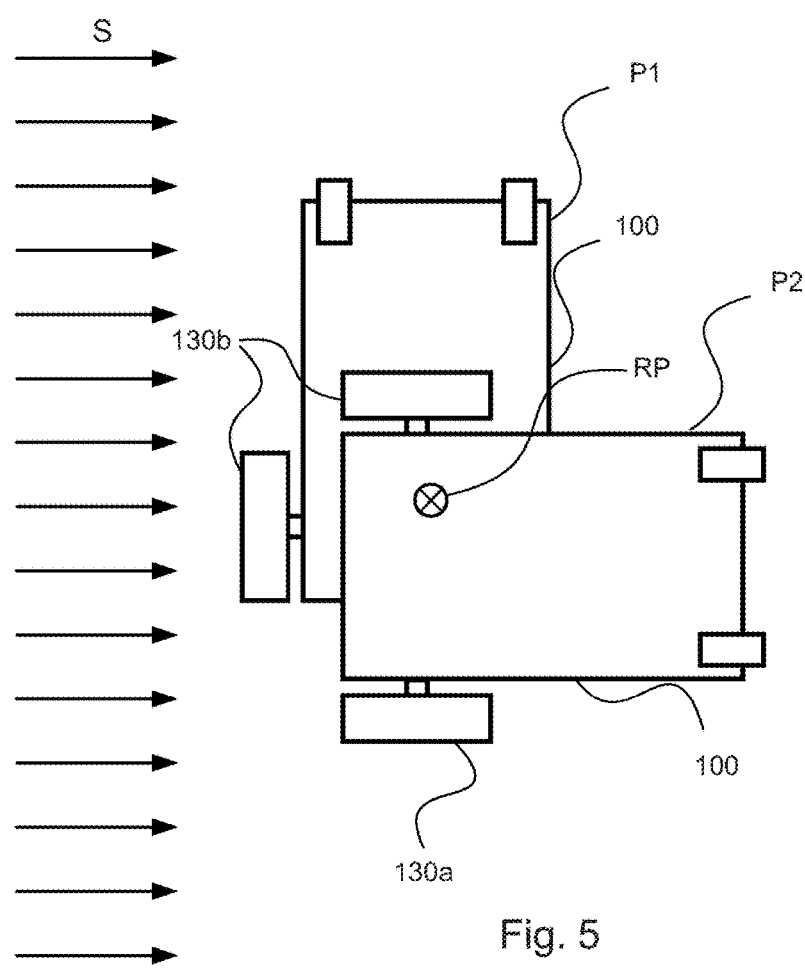
FIG. 5 is a schematic plan view showing two positions of the robotic lawn mower during turn in a slope.

In FIG. 5, an exemplary turn in a slope denoted by arrows S, sloping from an upper level on the left side of FIG. 5 to a lower level on the right side of FIG. 5, of the robotic work tool 100 is shown. In a first position P1, a turn is initiated by rotating the driving wheel 130*b* in an opposite direction compared to the drive wheel 130*a*. The rotational speed of the drive wheel 130*b* is lower than the rotational speed of the drive wheel 130*a*, and, as mentioned, in an opposite direction.

The different directions of the driving wheels will make the robotic work tool 100 turn upwards in FIG. 5, towards a position P2. As can be seen, the driving wheel 130*a* has moved considerably longer from position P1 to position P2 compared to the driving wheel 130*b*, due to the lower rotational speed of the driving wheel 130*b* as compared to the driving wheel 130*a*. Consequently, when comparing with FIG. 4, it is clear that the driving wheel having the most load from the weight of the robotic work tool 100, and hence best grip, has the fastest rate of rotation.

An effect of the different rotational speeds is that the rotation point (defined as A in FIG. 3, RP in FIG. 5) will move to an off-centre position. Actually, it will move towards the wheel having the lower rotational speed if the wheels have opposite rotational directions. If the wheel having the lower rotational speed would not rotate at all, the turning point RP would be identical to the non-rotating wheel, and in case the slower rotating wheel would have the same rotational direction as the wheel having the faster rotation, the turning point RP would end up outside the robotic work tool 100, however on an axle extending through the shafts of the driving wheels 130, 130*b*.

According to the invention, it is possible to perform all turns by rotating one driving wheel with a slower rotational speed than the other wheel, but to have the best effect, some kind of indicator measuring wheel slip or risk of wheel slip must be used.

In a first embodiment, an inclinometer (referenced 190 in FIG. 1) measuring the deviation from a horizontal position, i.e. a position wherein the robotic work tool 100 is placed on plane ground, of the robotic work tool 100 is used. The inclinometer may measure both the lengthwise inclination and/or the sidewise inclination. If the lengthwise inclination is measured, this information could be used for deciding whether a turning strategy according to the invention or the prior art should be used. However, in order to fully utilize the potential, it is preferred to also know the sideways inclination.

Actually, it is not even necessary to have any information on the lengthwise inclination; if only a sideways inclinometer is used, the rotational speed of the driving wheels may be controlled responsive to the information, e.g. in the following fashion:

Consider a robotic work tool 100 moving straight down a slope or straight up a slope having a certain inclination. If only a sideways inclinometer is used, the robotic work tool 100 will not know whether it travels in an upward slope, a downward slope or on plane ground. In a first method step, one of the driving wheels is rotated in the different direction with the same speed as the other wheel; if the sideways inclination meter does not indicate any inclination, both driving wheels will have the same grip.

In a second method step, the inclination meter will indicate whether the robotic work tool 100 travelled in a downward or upward slope if this is the case (compare with FIG. 5; in position P1, a sideways inclinometer will not give any reading on the robotic work tool 100 leaning; in position P2, it will).

In a third method step, the driving wheels are controlled to rotate in a fashion such that the turning point RP is moved towards the wheel having the least load from the weight of the robotic work tool 100, and consequently the least grip.

It is, however, preferred to have information on both the sideways and lengthwise inclination.

Consider the situation where the robotic work tool 100 is moving up or down a slope with an angle from the straight up or straight down direction. Then, some further method steps may be added, namely:

Measuring the lengthwise inclination of the robotic work tool 100;

determining a total inclination of the slope;

and controlling the driving direction and speeds of the driving wheels such that the turning point RP of the robotic work tool 100 is shifted towards the driving wheel having the lowest load and hence lowest grip by adjusting the driving speeds of the driving wheels accordingly.

The use of both sideways and lengthwise inclination meters also gives the opportunity to avoid wheel slip by avoiding to move the centre of gravity in an upward direction.

Consider a situation wherein a robotic work tool 100 is moving in a direction down a slope S according to FIG. 5, but in a direction defined by a position between the position P1 and the position P2. In that case, it is not wise to perform the turn towards the left, i.e. towards the position P2. With reference to FIG. 3*b*, the centre of gravity of the robotic work tool 100 is located in front of the driving wheels, and if the robotic work tool 100 is turned to the left, the risk of slip of the driving wheels increases due to the fact that the centre of gravity CG of the robotic work tool 100 moves upwards in the slope. If the data from the inclinometers measuring both sideways and lengthwise inclination is used, the robotic work tool 100 can determine to turn in the other direction, effectively reducing the risk of wheel slip.

This embodiment could be summarized as follows:

Method for avoiding wheel slip of a robotic work tool (100) during turn being initiated by a detection of a boundary (250) by at least one detector (170) and effected by rotating driving wheels (130a, 130b) of the robotic work tool (100) with different speed or different direction, characterized by the steps of:

determining a wheel (130a, 130b) slip or risk of wheel (130a, 130b) slip by:

aba: if data from at least one inclinometer be used, determining risk of wheel slip if the at least one inclinometer detects an inclination exceeding a certain threshold value;

abb; if risk of wheel slip has been determined, use the strategy of:

abc: reducing the rotational speed of either of the driving wheels (130a, 130b) such that the robotic work tool (100) performs a U-turn; or abd: reversing the rotational direction of one driving wheel and reducing the rotational speed of the driving wheel having the least expected grip.

In another embodiment, at least one accelerometer referenced 190 in FIG. 3A and in FIG. 1 is used to determine wheel slip. As could be understood, any known change of rotation of the driving wheels will lead to a corresponding acceleration or deceleration of the robotic work tool 100. If the accelerometer readings do not correspond to the acceleration or deceleration expected from a shift in rotational speed or rotational direction of the driving wheels, the robotic work tool 100 can determine that any of the wheels slip.

By providing more than one accelerometer, the robotic work tool 100 may also determine which wheel is slipping.

Referring to FIG. 3A, there are two accelerometers 190a and 190b (commonly referenced 190 in FIG. 1) provided in the vicinity of the corresponding driving wheels 130a and 130b. In case any of the driving wheels changes direction or speed of rotation, there will be a change of acceleration measured by the corresponding accelerometer, and by comparing the acceleration measured by the accelerometer and compare it to an expected acceleration corresponding to the changed direction or speed of rotation, it can be concluded whether the wheel is spinning. If the accelerometer reading indicates a wheel spinning, the rotational speed of that wheel is lowered in order to avoid further spinning of that wheel.

This embodiment could be summarized as follows:

Method for avoiding wheel slip of a robotic work tool (100) during turn being initiated by a detection of a boundary (250) by at least one detector (170) and effected by rotating driving wheels (130a, 130b) of the robotic work tool (100) with different speed or different direction, characterized by the steps of:

a. determining a wheel (130a, 130b) slip or risk of wheel (130a, 130b) slip by:

aa. using data from at least one accelerometer (190a, 190b);

aaa. use data from at least one accelerometer (190a, 190b) by comparing measured acceleration data with data expected for a certain shift of rotational speed or direction of the driving wheels (130a, 130b) and;

aab. reducing the rotational speed of the driving wheel (130, 130b) should the measured acceleration data and the expected acceleration data mismatch;

In still another embodiment, it is possible to combine both accelerometers and inclinometers as disclosed above.

In another embodiment of the invention, the inclinometer or inclinometers is or are used to determine whether or no the robotic tool 100 is running in a slope or not. According to this embodiment of the invention, the sensors 170 sensing the presence or near presence of a boundary wire will change a threshold value for performing a turn if the inclinometers sense that the robotic tool 100 travels in a slope. The threshold value for making a turn will be lower, such that the robotic tool will start its turn earlier than when the robotic tool 100 travels on flat ground. There are two sensors 170 arranged on the robotic work tool 100; one to the left and one to the right. It should be noted that in one embodiment the robotic work tool 100 may also be arranged with one or more rear sensors for an alternative and possibly improved determination of the robotic work tool's 100 position in relation to the boundary wire 250. According to this embodiment of the invention, wheel slip is avoided by performing a U-turn as the robotic work tool approaches a boundary. The method steps for determining whether a U-turn should be performed rather than the standard turn, wherein one of the wheels (130a, 130b) is reversed with regards to direction, may be as follows:

Determining that the inclination meters indicates that the robotic work tool runs in a slope;

Recalibrating threshold values of the sensors 170 for making a turn; When any of the sensors 170 senses the magnetic field exceeding the recalibrated threshold value, instructing a U-turn by decreasing the rotational speed of the driving wheel opposite of the sensor 170 having indicated the recalibrated threshold value; and Keeping the lower rotational speed of the driving wheel until the robotic work tool has made the desired turn.

In order to determine the desired turn, the signal obtained from the two sensors 170 can be compared:

Consider the situation the robotic work tool 100 approaches the boundary wire 260 in a straight angle or substantially head on; when any of the sensors registers a magnetic field exceeding the recalibrated threshold value, the magnetic field of the other sensor is immediately compared to the threshold value. In this situation, the other sensor 170 will sense a magnetic field being identical or very close to identical to the sensor having sensed a magnetic field exceeding the threshold value. Then, the robotic tool 100 will perform a turn significantly exceeding 90 degrees, for example 140-170 degrees. A 180 degree turn should be avoided, due to the risk of the robotic work tool encountering another boundary or an obstacle running in a parallel direction compared to the in a straight angle, making another 180 degree turn, with the result that the robotic work tool running back and forth between the lines, hence not servicing the entire area limited by the boundary. The reason that the turn should exceed 90 degrees significantly is that it should be avoided that the robotic work tool follows the boundary for too long distances.

If, on the other hand, there is a significant difference between the readings of the two sensors 170, the robotic work tool 100 can determine that it approaches the boundary in an oblique angle. Consequently, it may perform a lesser turn than if it approaches the boundary in a straight angle. For example, it may decrease the rotational speed of the wheel 130 sufficiently for performing a turn of about 90 degrees.

It is also possible to use the derivative of the magnetic field increase to deduce whether the robotic work tool 100 approaches the boundary in a straight angle or an oblique angle. It is of course also possible to use both the threshold value and the derivative to deduce when a turn should be made and whether a lesser turn, i.e. around 90 degrees, or a wider turn, i.e. about 140-170 degrees, should be used.

In the embodiments where the robotic work tool performs a turn by reducing the rotational speed of one wheel rather than reversing the rotation, the rotation point RP will, as mentioned, not only approach the wheel having the lower rotational speed, it will pass it and end up outside the robotic work tool.

This embodiment could be summarised as follows:

Method for avoiding wheel slip of a robotic work tool (100) during turn being initiated by a detection of a boundary (250) by at least one detector (170) and effected by rotating driving wheels (130a, 130b) of the robotic work tool (100) with different speed or different direction, characterized by the steps of:
 a. determining a wheel (130a, 130b) slip or risk of wheel (130a, 130b) slip by:
  aa. using data from at least one inclinometer;
  aba: using data from the inclinometer for determining risk of wheel slip if the at least one inclinometer detects an inclination exceeding a certain threshold value;
  abb: if risk of wheel slip has been determined, use the strategy of:
  abc: reducing the rotational speed of either of the driving wheels (130a, 130b) such that the robotic work tool (100) performs a U-turn.

FIG. 6 shows a flowchart for a general method according to one embodiment of the teachings herein. A robotic work tool detects 610 a boundary wire and determines 620 if the robotic work tool is in a slope, and if so, perform a turn 630 by rotating each wheel at a different speed thereby reducing a risk of the robotic work tool getting stuck.

One benefit of the teachings herein is that the robotic work tool is enabled to adapt to different areas of the work area and adjust its propulsion based on characteristics of a slope thereby reducing the risk of wheel slip and getting stuck.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool configured for improved turning, said robotic work tool comprising:
 a slope detector,
 at least one magnetic field sensor,
 a controller, and
 at least two driving wheels,
 wherein the robotic work tool is configured, via the controller, to:
  determine that the robotic work tool is on a slope via the slope detector;
  in response to determining that the robotic work tool is on the slope, change a magnetic field detection threshold for initiating a turn to a modified magnetic field detection threshold;
  detect, via the at least one magnetic field sensor, that a magnetic field from a boundary wire exceeds the modified magnetic field detection threshold; and
  in response to detecting that the magnetic field from the boundary wire exceeds the modified magnetic field detection threshold, instruct the robotic work tool to perform a turn based on the slope by rotating at least one driving wheel at a speed different from a speed of rotation of another driving wheel.

2. The robotic work tool according to claim 1, wherein the robotic work tool is further configured to determine that the robotic work tool is on the slope by using data from said slope detector, the slope detector being at least one inclinometer, the slope detector indicating that the robotic work tool is on the slope by indicating an inclination exceeding a certain threshold value.

3. The robotic work tool according to claim 1, wherein the robotic work tool is further configured to avoid wheel slip during the turn on the slope by:
 determining a wheel slip or risk of wheel slip by using data from said slope detector, the slope detector being at least one accelerometer;
 comparing measured acceleration data with data expected for a certain shift of rotational speed of one of the driving wheels; and
 reducing the rotational speed of the driving wheel indicating a wheel slip or risk of wheel slip which is indicated by a mismatch between the measured acceleration data and the expected acceleration data.

4. The robotic work tool according to claim 1, wherein the robotic work tool is further configured to reverse a rotational direction of one driving wheel and reduce rotational speed of the driving wheel having a least expected grip.

5. The robotic work tool according to claim 1, wherein the robotic work tool is further configured to:
 detect that the robotic work tool is approaching the boundary wire substantially head on, and in response thereto,
 reduce rotational speed of either of the driving wheels such that the robotic work tool performs a U-turn.

6. The robotic work tool according to claim 5, wherein the robotic work tool is configured to detect that the robotic work tool is approaching the boundary wire substantially head on by comparing sensor signals from at least one front magnetic field sensor to sensor signals from another front magnetic field sensor, and if the sensor signals are substantially equal for the front magnetic field sensors, determine that the robotic work tool is approaching the boundary wire substantially head on.

7. The robotic work tool according to claim 1, wherein the robotic work tool is further configured to:
 detect that the robotic work tool is approaching the boundary wire at an angle, and in response thereto,
 reduce rotational speed of either of the driving wheels such that the robotic work tool performs an L-turn.

8. The robotic work tool according to claim 7, wherein the robotic work tool is configured to detect that the robotic work tool is approaching the boundary wire at an angle by comparing sensor signals from at least one magnetic field sensor disposed on a front portion of the robotic work tool to sensor signals from another magnetic field sensor disposed on the front portion of the robotic work tool, and if the sensor signals for the magnetic field sensors disposed on the front portion of the robotic work tool differ by more than a threshold value, determine that the robotic work tool is approaching the boundary wire at an angle.

9. The robotic work tool according to claim 3, wherein the at least one accelerometer is two accelerometers, the two accelerometers being positioned such that each of the accelerometers can measure an acceleration imparted by a change of rotational speed or direction of a corresponding driving wheel.

10. The robotic work tool according to claim 2, wherein the at least one inclinometer measures at least the sideways inclination of the robotic work tool.

11. The robotic work tool according to claim 10, wherein the sideways inclination of the robotic work tool is used to determine which driving wheel has a least load and consequently a least grip.

12. The robotic work tool according to claim 11, wherein a reduction of rotational speed of the driving wheel having the least load is proportional to a measured inclination.

13. The robotic work tool according to claim 12, wherein the rotational speed of the driving wheel having the least load is zero when the sideways inclination has reached a predetermined threshold value.

14. The robotic work tool according to claim 13, wherein the predetermined threshold value is determined by a maximum slope of the ground to be serviced.

15. The robotic work tool according to claim 13, wherein the predetermined threshold value is 35 degrees.

16. The robotic work tool according to claim 1, wherein the robotic work tool is a robotic lawnmower.

17. The robotic work tool according to claim 1, wherein the controller is configured to change the magnetic field detection to the modified magnetic field detection threshold, the modified magnetic field detection threshold being reduced such that the robotic work tool starts to turn earlier than when the robotic work tool starts to turn on flat ground.

18. The robotic work tool according to claim 1, wherein the at least one magnetic field sensor comprises a first magnetic field sensor and a second magnetic field sensor;
wherein the robotic work tool is further configured, via the controller, to determine a difference between magnetic field readings from the first magnetic field sensor and the second magnetic field sensor; and
wherein the robotic work tool is further configured to, in response to detecting the magnetic field form the boundary wire exceeds the modified magnetic field detection threshold, instruct the robotic work tool to perform the turn based on the slope and the difference between magnetic field readings from the first magnetic field sensor and the second magnetic field sensor.

19. A robotic work tool system comprising:
a robotic work tool; and
a boundary wire demarcating a work area;
wherein the robotic work tool comprises:
a slope detector,
at least one magnetic field sensor,
a controller, and
at least two driving wheels,
wherein the robotic work tool is configured, via the controller, to:
determine that the robotic work tool is on a slope via the slope detector;
in response to determining that the robotic work tool is on the slope, change a magnetic field detection threshold for initiating a turn to a modified magnetic field detection threshold;
detect, via the at least one magnetic field sensor, that a magnetic field from a boundary wire exceeds the modified magnetic field detection threshold; and
in response to detecting that the magnetic field from the boundary wire exceeds the modified magnetic field detection threshold, instruct the robotic work tool to perform a turn based on the slope by rotating at least one driving wheel at a speed different from a speed of rotation of another driving wheel.

20. A method for operating a robotic work tool for improved turning, said robotic work tool comprising a slope detector, at least one magnetic field sensor, a controller, and at least two driving wheels, the method, executed by the controller, comprising:
determining that the robotic work tool is on a slope via the slope detector;
in response to determining that the robotic work tool is on the slope, changing a magnetic field detection threshold for initiating a turn to a modified magnetic field detection threshold;
detecting, via the at least one magnetic field sensor, that a magnetic field from a boundary wire exceeds the modified magnetic field detection threshold; and
in response to detecting that the magnetic field from the boundary wire exceeds the modified magnetic field detection threshold, instructing the robotic work tool to perform a turn based on the slope by rotating at least one driving wheel at a speed different from a speed of rotation of another driving wheel.

* * * * *